United States Patent
Takahashi

(10) Patent No.: US 7,843,779 B2
(45) Date of Patent: Nov. 30, 2010

(54) RECORDING METHOD, INFORMATION RECORDING MEDIUM, REPRODUCING METHOD, INFORMATION RECORDING DEVICE, AND INFORMATION REPRODUCING DEVICE

(75) Inventor: Naoto Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1156 days.

(21) Appl. No.: 11/138,327

(22) Filed: May 27, 2005

(65) Prior Publication Data

US 2005/0265163 A1    Dec. 1, 2005

(30) Foreign Application Priority Data

Jun. 1, 2004  (JP) ............... 2004-163016

(51) Int. Cl.
*G11B 5/09* (2006.01)

(52) U.S. Cl. .................... 369/47.1; 369/53.1

(58) Field of Classification Search ............... 369/47.1, 369/53.1
See application file for complete search history.

(56) References Cited

U.S. PATENT DOCUMENTS

| 5,414,451 | A | 5/1995 | Sugiyama et al. | |
| 6,473,380 | B1 | 10/2002 | Takahashi | |
| 6,496,459 | B2 * | 12/2002 | Ueki | 369/47.53 |
| 6,996,049 | B2 * | 2/2006 | Kuroda | 369/59.25 |
| 2003/0103431 | A1 * | 6/2003 | Kuroda | 369/59.25 |
| 2004/0085874 | A1 * | 5/2004 | Akiyama et al. | 369/47.53 |
| 2004/0213117 | A1 * | 10/2004 | Sasaki | 369/53.24 |
| 2004/0264322 | A1 * | 12/2004 | Shishido et al. | 369/47.22 |
| 2006/0146666 | A1 * | 7/2006 | Ueda et al. | 369/47.1 |

FOREIGN PATENT DOCUMENTS

| JP | 05-101398 | 4/1993 |
| JP | 08-096406 | 4/1996 |
| JP | 2000-293947 | 10/2000 |
| JP | 2004288308 | * 10/2004 |

* cited by examiner

*Primary Examiner*—Joseph H Feild
*Assistant Examiner*—Ifedayo Iluyomade
(74) *Attorney, Agent, or Firm*—Dickstein Shapiro LLP

(57) ABSTRACT

A recording method for recording information into an information recording medium having a plurality of recording layers includes a step of recording information, for specifying a non-recording layer where user data are not recorded, onto at least one of the recording layers.

2 Claims, 12 Drawing Sheets

FIG.9

| BYTE NUMBER | CONTENT |
|---|---|
| 0 | DISC CATEGORY AND VERSION NUMBER |
| 1 | DISC SIZE |
| 2 | DISC STRUCTURE |
| 3 | RECORDING DENSITY |
| 4 TO 15 | DATA ZONE ALLOCATION |
| 16 TO 17 | RESERVED ALL |
| 18 | RECORDING LAYER INFORMATION |
| 19 TO 26 | DISC MANUFACTURER ID |
| 27 TO 29 | MEDIA TYPE ID |
| 30 | PRODUCT REVISION NUMBER |
| 31 | NUMBER OF PHYSICAL FORMAT INFORMATION BYTES IN USE IN ADIP |
| 32 | RECORDING VELOCITY |
| ⋮ | ⋮ |

RECORDING METHOD, INFORMATION RECORDING MEDIUM, REPRODUCING METHOD, INFORMATION RECORDING DEVICE, AND INFORMATION REPRODUCING DEVICE

BACKGROUND OF THE INVENTION

1. Field of the Invention

The present invention relates to recording methods, information recording media, reproducing methods, information recording devices, and information reproducing devices, and more specifically, to a recording method for recording information into an information recording medium having plural recording layers, an information recording medium having plural recording layers, a reproducing method for reproducing information from an information recording medium having plural recording layers, an information recording device for recording information into an information recording medium having plural recording layers, and an information reproducing device for reproducing information from an information recording medium having plural recording layers.

2. Description of the Related Art

Recently, as digital technology and a data compression technology have advanced, an optical disk such as DVD (digital versatile disk) has begun to attract attention, as an information recording medium for recording information (contents) of music, a movie, pictures and computer software. Following the reduction of the price of the disk, an optical disk device wherein the optical disk is used as a subject medium for information recording also has become widespread.

Furthermore, there is a tendency that the information amount of the contents is increasing. The recording capacity of the optical disk is expected to increase. An optical disk (multilayer disk) having plural recording layers as means for increasing the recording capacity of the optical disk, and a device whose access subject is the multilayer disk have been developed. See Japan Laid-Open Patent Application Publication No. H08-96406, for example.

Since this multilayer disk has plural recording layers, it is possible to record more data into the multilayer disk than a recording medium formed by a single recording layer. For example, it is possible to record approximately twice as much data as can be recorded into a single layer DVD-ROM having a single recording layer, into a bi-layer DVD-RPM having two recording layers.

In this bi-layer DVD-ROM, it is necessary to record the data onto both recording layers. In a case where the data are recorded onto only a first recording layer but not recorded onto a second recording layer, if a laser beam is concentrated on the second recording layer due to vibration, for example, during reproducing of the first recording layer, address information cannot be obtained (address error). As a result of this, reproducing may not be continued.

In addition, in a case of a bi-layer DVD+R (DVD+Recordable) having two recording layers, for example, if the disk close is processed in a state where user data are recorded onto only a single recording layer, it is necessary to record some data onto the other recording layer where the user data are not recorded. For example, in the bi-layer DVD+R, in a case where user data UD are recorded onto only a first recording layer L0 and the disk close is processed as shown in FIG. 1-(A), data formed by a lead in LI and a lead out LO are recorded onto almost the entire surface of the second recording layer L1 as shown in FIG. 1-(B). Therefore, in this case, it may take a lot of time for processing the disk close.

SUMMARY OF THE INVENTION

Accordingly, it is a general object of the present invention to provide a novel and useful recording method, information recording medium, reproducing method, information recording device, and information reproducing device in which one or more of the problems described above are eliminated.

Another and more specific object of the present invention is to provide a recording method and an information recording device whereby information can be recorded into an information recording medium having plural recording layers in a short period of time.

It is also an object of the present invention to provide an information recording medium having plural recording layers, whereby information can be stably reproduced even if a non-recording layer, where no user data are recorded, exists.

It is also an object of the present invention to provide a reproducing method and an information reproducing device whereby information recorded in an information recording medium having plural recording layers can be stably reproduced.

The above objects of the present invention are achieved by a recording method for recording information into an information recording medium having a plurality of recording layers, including:

a step of recording information, for specifying a non-recording layer where user data are not recorded, onto at least one of the recording layers.

According to the above-mentioned invention, since it is not necessary to record data onto the non-recording layer, it is possible to reduce the recording time for the information recording medium having plural recording layers as compared with the conventional art. Hence, it is possible to record the information into the information recording medium having plural recording layers in a short period of time.

The recording method may further include a step of determining whether the non-recording layer exists in the recording layers prior to the step of recording the information for specifying the non-recording layer.

The information for specifying the non-recording layer may be information regarding the non-recording layer.

The information for specifying the non-recording layer may be information regarding a recording layer excluding the non-recording layer.

The information for specifying the non-recording layer may be recorded in an area where management information is recorded in the information recording medium.

The above-mentioned object of the present invention is achieved by an information recording medium, including:

a plurality of recording layers including a non-recording layer where user data are not recorded;

wherein information for specifying the non-recording layer is recorded in the information recording medium.

According to the above-mentioned invention, when the optical disk is set into the information reproducing device, the non-recording layer can be specified based on the information specifying the non-recording layer. Hence, it is possible to stably reproduce the information.

The information for specifying the non-recording layer may be information regarding the non-recording layer.

The information for specifying the non-recording layer may be information regarding a recording layer excluding the non-recording layer.

The information for specifying the non-recording layer may be recorded in an area where management information is recorded in the information recording medium.

The above-mentioned object of the present invention is achieved by a reproducing method for reproducing information from an information recording medium by irradiating a laser beam, the information recording medium including a plurality of recording layers including a non-recording layer where user data are not recorded; wherein information for specifying the non-recording layer is recorded in the information recording medium;

the reproducing method including:

a step of setting a prevention of concentration of the laser beam onto the non-recording layer specified based on the information for specifying the non-recording layer.

According to the above-mentioned invention, when the information is reproduced from the information recording medium, concentrating the laser beam onto the specified non-recording layer based on the information specifying the non-recording layer of the information recording medium is prevented, so that the laser beam is irradiated on the recording later other than the non-recording layer and the information is reproduced. Hence, the generation of a reproduction error due to concentration of the laser beam onto the non-recording layer can be prevented and it is possible to stably reproduce the information recorded in the information recording medium.

The above-mentioned object of the present invention is achieved by a reproducing method for reproducing information from an information recording medium by irradiating a laser beam, the information recording medium including a plurality of recording layers including a non-recording layer where user data are not recorded; wherein information for specifying the non-recording layer is recorded in the information recording medium;

the reproducing method including:

a step of adjusting a position of concentration of the laser beam based on the information for specifying the non-recording layer if a reading error of an address exists.

According to the above-mentioned invention, if the reading error of the address occurs during the reproduction of the information from the information recording medium, the position of the concentration of the laser beam is adjusted based on the information specifying the non-recording layer of the information recording medium. Hence, if the laser beam is concentrated on the non-recording layer, the position of the concentration of the laser beam is adjusted so that the laser beam is concentrated on the recording layer which is a subject of the reproduction. Hence, it is possible to stably reproduce the information recorded in the information recording medium.

The above-mentioned object of the present invention is achieved by an information recording device for recording information into an information recording medium having a plurality of recording layers, including:

a recording part configured to record the information onto a recording layer that is a recording subject among the plural recording layers; and a process device configured to record information, for specifying a non-recording layer where user data are not recorded, onto at least one of the recording layers via the recording part.

According to the above-mentioned invention, since it is not necessary to record data onto the non-recording layer, it is possible to reduce the recording time for the information recording medium having plural recording layers as compared with the conventional art. Hence, it is possible to record the information onto the information recording medium having plural recording layers in a short period of time.

The information for specifying the non-recording layer may be information regarding the non-recording layer.

The information for specifying the non-recording layer may be information regarding a recording layer excluding the non-recording layer.

The information for specifying the non-recording layer may be recorded in an area where management information is recorded in the information recording medium.

The above-object of the present invention is achieved by an information reproducing device for reproducing information from an information recording medium, the information recording medium, including a plurality of recording layers including a non-recording layer where user data are not recorded;

wherein information for specifying the non-recording layer is recorded in the information recording medium;

the information reproducing device, including:

an optical pick up device configured to concentrate a laser beam onto a recording layer that is a reproducing subject among the plural recording layers of the information recording medium;

an obtaining part configured to obtain the information for specifying the non-recording layer from the information recording medium; and a process device configured to control the optical pick up device based on the information for specifying the non-recording layer so as to reproduce information from the recording layer that is the reproducing subject.

According to the above-mentioned invention, when the information is reproduced from the information recording medium, the information specifying the non-recording layer is obtained from the information recording medium and the optical pick up device is controlled by this information so that the information is reproduced from the recording layer which is a subject of the reproduction. In this case, the optical pick up device can be controlled so that the laser beam is securely concentrated on the recording layer which is the subject of the reproduction based on the information that is obtained in advance and that specifies the non-recording layer. Hence, it is possible to stably reproduce the information recorded in the information recording medium.

The process device may prevent concentration of the laser beam onto the non-recording layer specified based on the information for specifying the non-recording layer.

The process device may adjust a position of concentration of the laser beam based on the information for specifying the non-recording layer if a reading error of an address exists.

Other objects, features, and advantages of the present invention will become more apparent from the following detailed description when read in conjunction with the accompanying drawings.

BRIEF DESCRIPTION OF THE DRAWINGS

FIG. 9 is a table for explaining a position where recording layer information is recorded;

DETAILED DESCRIPTION OF THE PREFERRED EMBODIMENTS

A description of the present invention and details of drawbacks of the related art are now given, with reference to FIG. 2 through FIG. 13, including embodiments of the present invention.

First Embodiment

Figure 2:
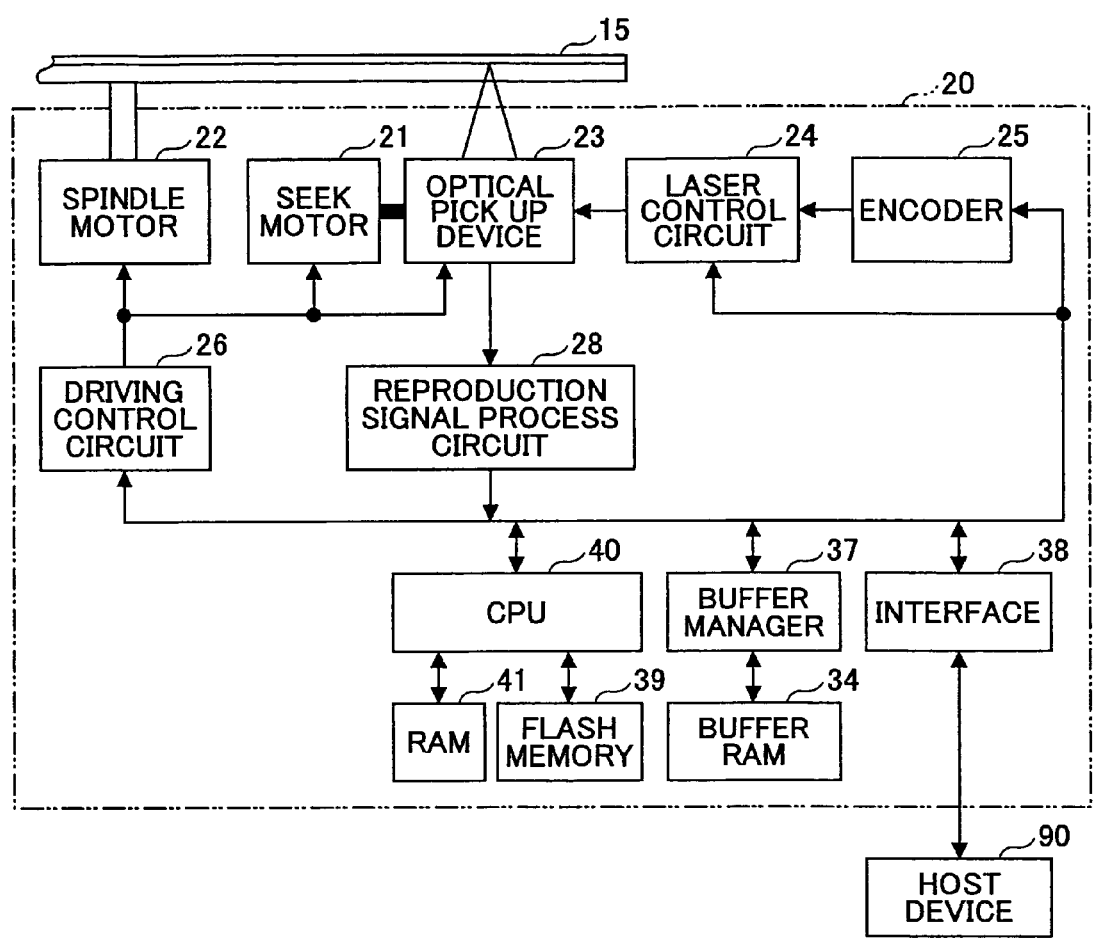
FIG. 2 is a block diagram showing a structure of an optical disk device of a first embodiment of the present invention.

A description of a first embodiment of the present invention is discussed with reference to FIG. 2 through FIG. 12. FIG. 2 is a block diagram showing a structure of an optical disk device 20 as an information recording device and an information reproducing device of the first embodiment of the present invention.

Figure 1:
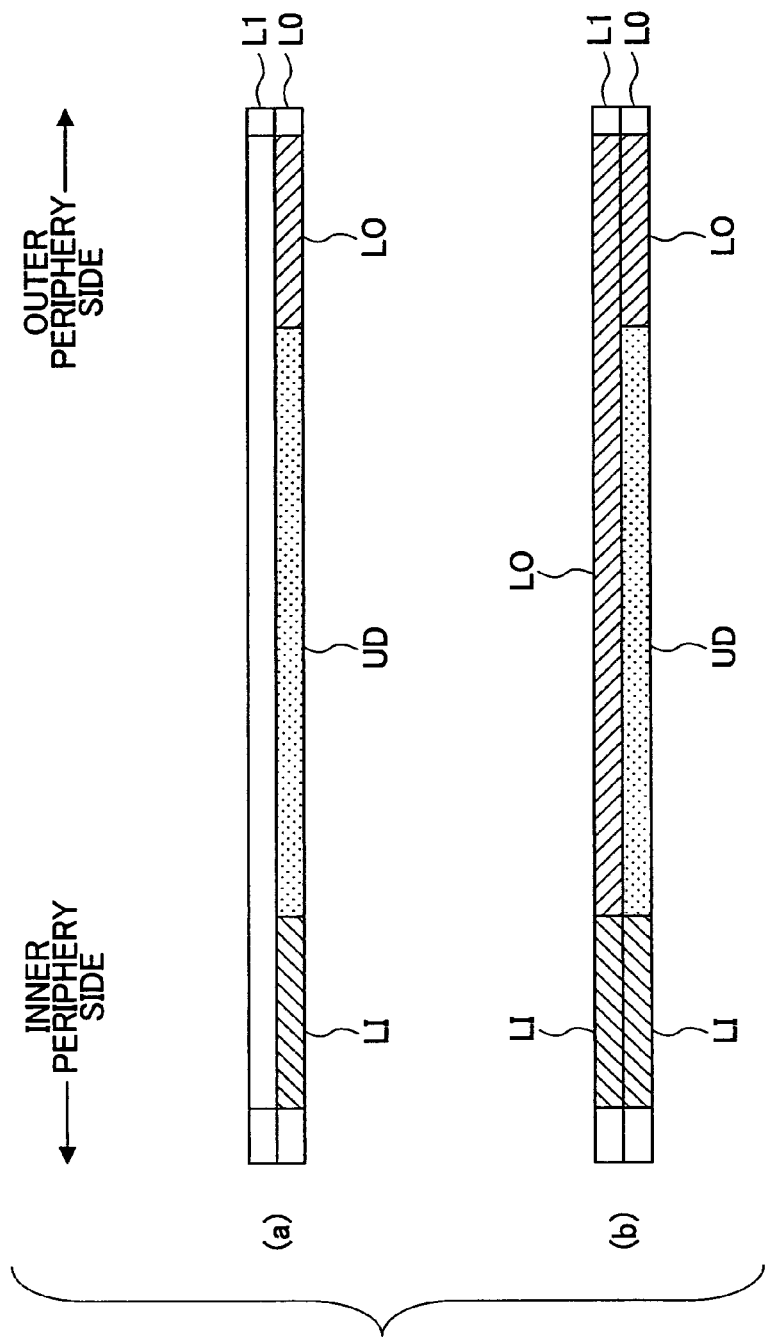
FIG. 1 is a cross-sectional view of an optical disk for explaining a related art disk closing process.

The optical device shown in FIG. 2 includes a spindle motor 22 for rotating an optical disk 15 as an information recording medium, an optical pick up device 23, a seek motor 21 for driving the optical pick up device 23 in a sledge direction, a laser control circuit 24, an encoder 25, a driving control circuit 26, a reproduction signal process circuit 28, a buffer RAM 34, a buffer manager 37, an interface 38, a flash memory 39, a CPU 40, a RAM 41, or the like. Arrows in FIG. 1 represent flows of main signals or information and do not represent all of the connection relationships of the blocks. In this embodiment, a bi-layer DVD+R having two recording layers L0 and L1 where a spiral-shaped track or concentric circular-shaped tracks are formed is used as an example of the optical disk 15.

The optical pick up device 23 irradiates a laser beam onto the recording layer that is an object for recording of the optical disk 15 where the spiral-shaped track or concentric circular-shaped tracks are formed. The optical pick up device 23 also receives a reflection light from the recording layer. The optical pick up device 23 includes a semiconductor laser as a light source and an object lens which leads light flux irradiated from the semiconductor laser onto the recording layer of the optical disk 15. The optical pick up device 23 also includes an optical system leading returning light flux reflected on the recording layer to a designated light receiving position, a light receiver which is provided at the light receiving position and receives the returning light flux, a driving system (focusing actuator and tracking actuator), or the like (not shown).

The reproduction signal process circuit 28 produces a servo signal (focus error signal, track error signal, or the like), a clock signal, an RF signal, and others based on the output signal from the light receiver forming the optical pick up device 23. The servo signal generated by the reproduction signal process circuit 28 is output to the driving control circuit 26. The clock signal is output to the encoder 25. The reproduction signal process circuit 28 detects address information from the output signal from the optical pick up device 23. In a case where the address information is detected, the address information is output to the CPU 40. In a case where the address information is not detected, an address alarm signal is output to the CPU 40. Furthermore, the reproduction signal process circuit 28 performs a decode process and an error detection process on the RF signal. In a case where an error is detected, after an error correction process is performed, the processed RF signal is temporarily stored in the buffer RAM 34 via the buffer manager 37 as reproduction data.

The driving control circuit 26 produces a driving signal of the tracking actuator for correcting a position gap of the objective lens in a tracking direction based on the track error signal from the reproduction signal process circuit 28. The driving control circuit 26 also produces a driving signal of the focusing actuator for correcting a focus gap of the objective lens based on the focus error signal. The respective produced driving signals are output to the optical pick up device 23. Thus, the tracking control and focus control are performed. In addition, the driving control circuit 26 produces, based on an instruction from the CPU 40, a driving signal for driving the seek motor 21 and a driving signal for driving the spindle motor 22. The driving signals are respectively output to the seek motor 21 and the spindle motor 22.

Data for recording, namely data recorded in the optical disk 15, and reproduction data, namely data reproduced from the optical disk 15 are temporarily stored in the buffer RAM 34. Input or output of the data to or from the buffer RAM 34 is managed by the buffer manager 37.

The encoder 25 takes out the data for recording stored in the buffer RAM 34 via the buffer manager 37 based on the instruction of the CPU 40. The encoder 25 modulates the data and adds an error correction code so as to produce a writing signal for the optical disk 15. The produced writing signal is output to the laser control circuit 24.

The laser control circuit 24 controls the power of the laser beam irradiating from the semiconductor laser included in the optical pick up device 23. For example, when the information is recorded, the driving signal of the semiconductor laser is produced by the laser control circuit 24 based on the writing signal, recording condition, emission property of the semiconductor laser, and others.

The interface 38 functions as a two-way communication interface to a host device 90 such as a personal computer. The interface 38 is in accordance with a standard interface such as ATAPI (AT Attachment Packet Interface), SCSI (Small Computer System Interface), and USB (Universal Serial Bus).

A program written in code that is readable by the CPU 40, recording conditions including recording strategy information, the emission property of the semiconductor laser, and others are stored in the flash memory 39.

The CPU 40 controls operations of the respective parts by following the program stored in the flash memory 39 and keeps data necessary for controlling in the RAM 41 and the buffer RAM 34.

[Recording Method]

Here, a recording method for the optical disk having two recording layers is discussed with reference to FIG. 3-(A) through FIG. 3-(D). There are an OPT (Opposite Track Path) method and a PTP (Parallel Track Path) method as recording methods for an optical disk having two recording layers.

Figure 3:
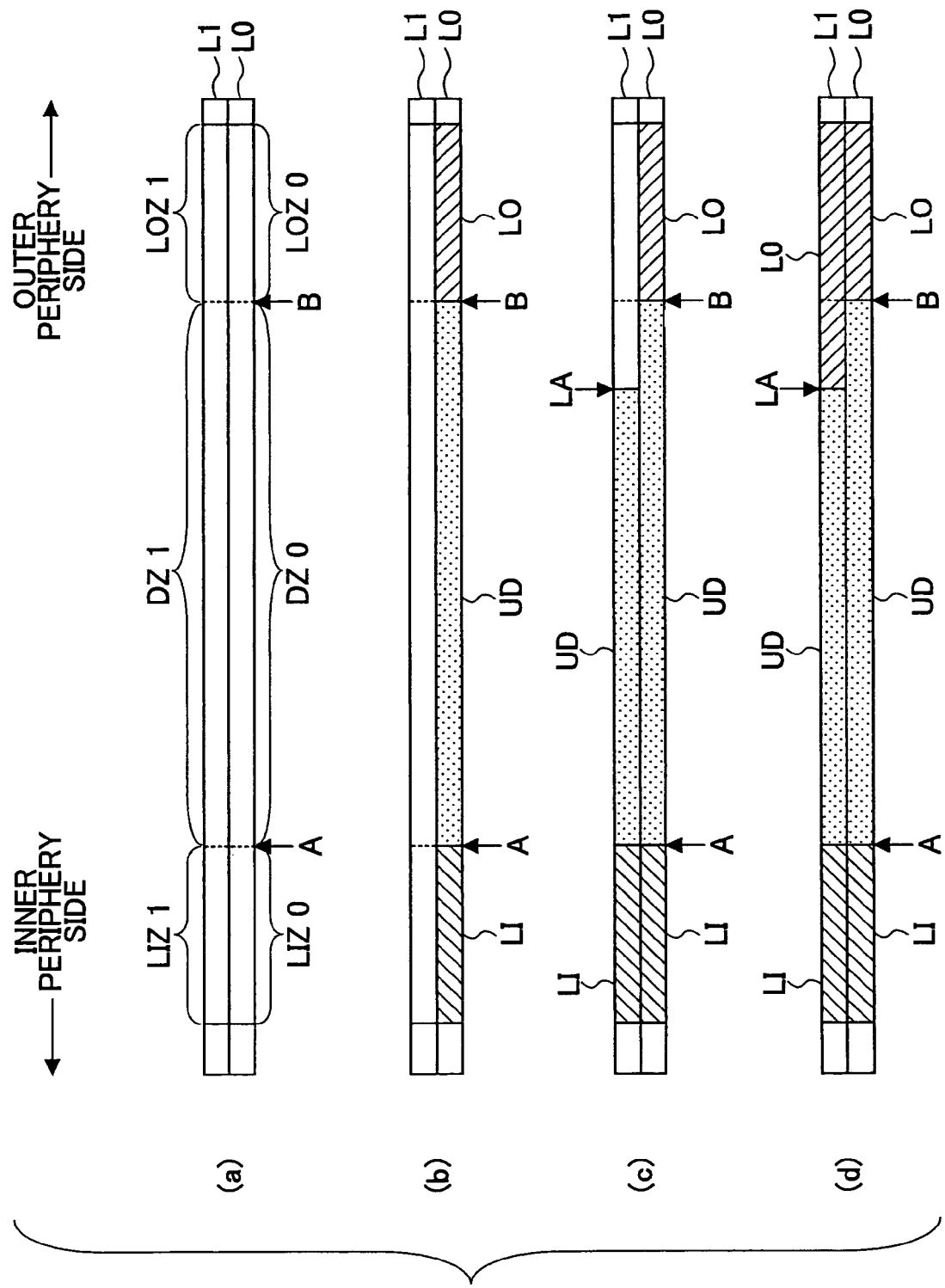
FIG. 3 is a cross-sectional view of an optical disk for explaining a PTP method.

As shown in FIG. 3-(A), in the PTP method, a lead-in zone (LIZ0), a data zone (DZ0), and a lead-out zone (LOZ0) are provided in turn from the inner periphery side to the outer periphery side in the recording layer L0.

A lead-in Zone (LIZ1), a data zone (DZ1), and a lead-out zone (LOZ1) are provided in turn from the inner periphery side to the outer periphery side in the recording layer L1. Physical addresses consecutive from the lead-in zone to through the lead-out zone are assigned in the recording layers L0 and L1.

After the lead-in (LI) is recorded in a part of the LIZ0 of the recording layer L0, the user data (UD) are started being recording in the DZ0 starting from an address A (30000h). After recording of the UD to an address B (260540h) is completed, the LI is recorded in the remaining part of the LIZ0 of the recording layer L0 and a lead out (LO) indicating an end of the DZ0 is recorded in the LOZ0. A state where the recording onto the recording layer L0 is completed is shown in FIG. 3-(B). As shown in FIG. 3-(C), after the LI is recorded in a part of the LIZ1 of the recording layer L1, remaining UD are started being recorded in the DZ1. After recording of the UD is completed, the LI is recorded in a remaining part of the LIZ1 of the recording layer L1 as shown in FIG. 3-(D) and the LO is recorded from the address (LA) where the UD are completed, to be written in the remaining area.

Figure 4:
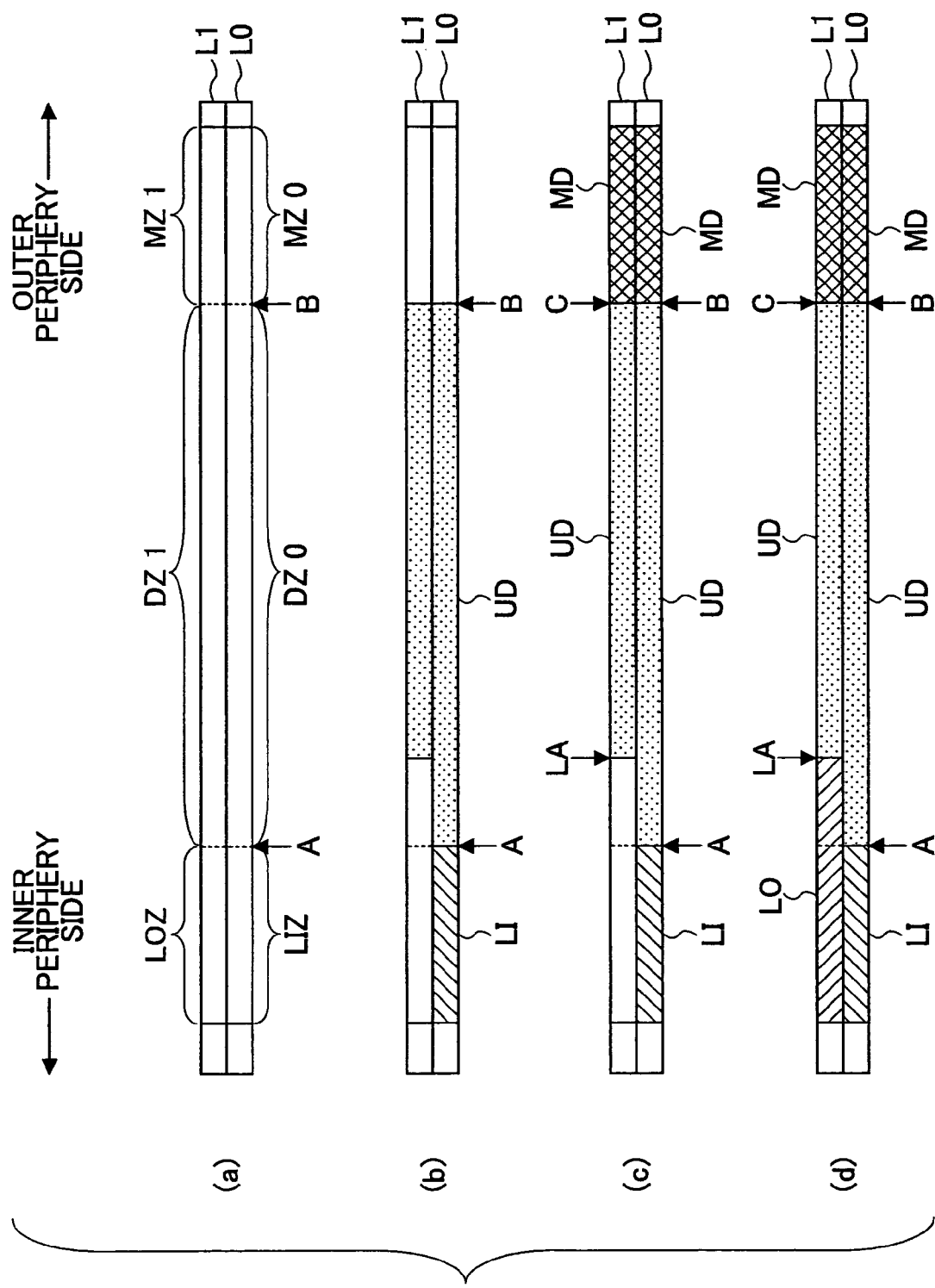
FIG. 4 is a cross-sectional view of an optical disk for explaining an OTP method.

As shown in FIG. 4-(A), in the OTP method, a lead-in zone (LIZ), a data zone (DZ0), and a middle zone (MZ0) are provided in turn from the inner periphery side to the outer periphery side in the recording layer L0. A middle zone (MZ1), a data zone (DZ1), and a lead-out zone (LOZ) are provided in turn from the outer periphery side to the inner periphery side in the recording layer L1. Physical addresses consecutive from the LIZ to the MZ0 are assigned in the recording layers L0. Addresses formed by bit-inverting the physical addresses of the recording layer L0 are assigned from the MZ1 toward the LOZ in the recording layer L1. In the recording layer L1, the physical address increases from the MZ1 toward the LOZ.

After the lead-in (LI) is recorded in a part of the LIZ of the recording layer L0, the user data (UD) are started being recording in the DZ0 starting from an address A (30000h). After recording of the UD to an address B is completed, the remaining UD are recorded in the DZ1 of the recording layer L1. A state where the recording of the UD is completed is shown in FIG. 4-(B). Then, as shown in FIG. 4-(C), the LI is recorded in the remaining part of the LIZ of the recording layer L0 and designated information MD is recorded in the MZ0 of the recording layer L0 and the MZ1 of the recording layer L1. As shown in FIG. 4-(D), the LO is recorded from the address (LA) where the UD are completed to be written in the remaining area.

[Recording Process]

Figure 5:
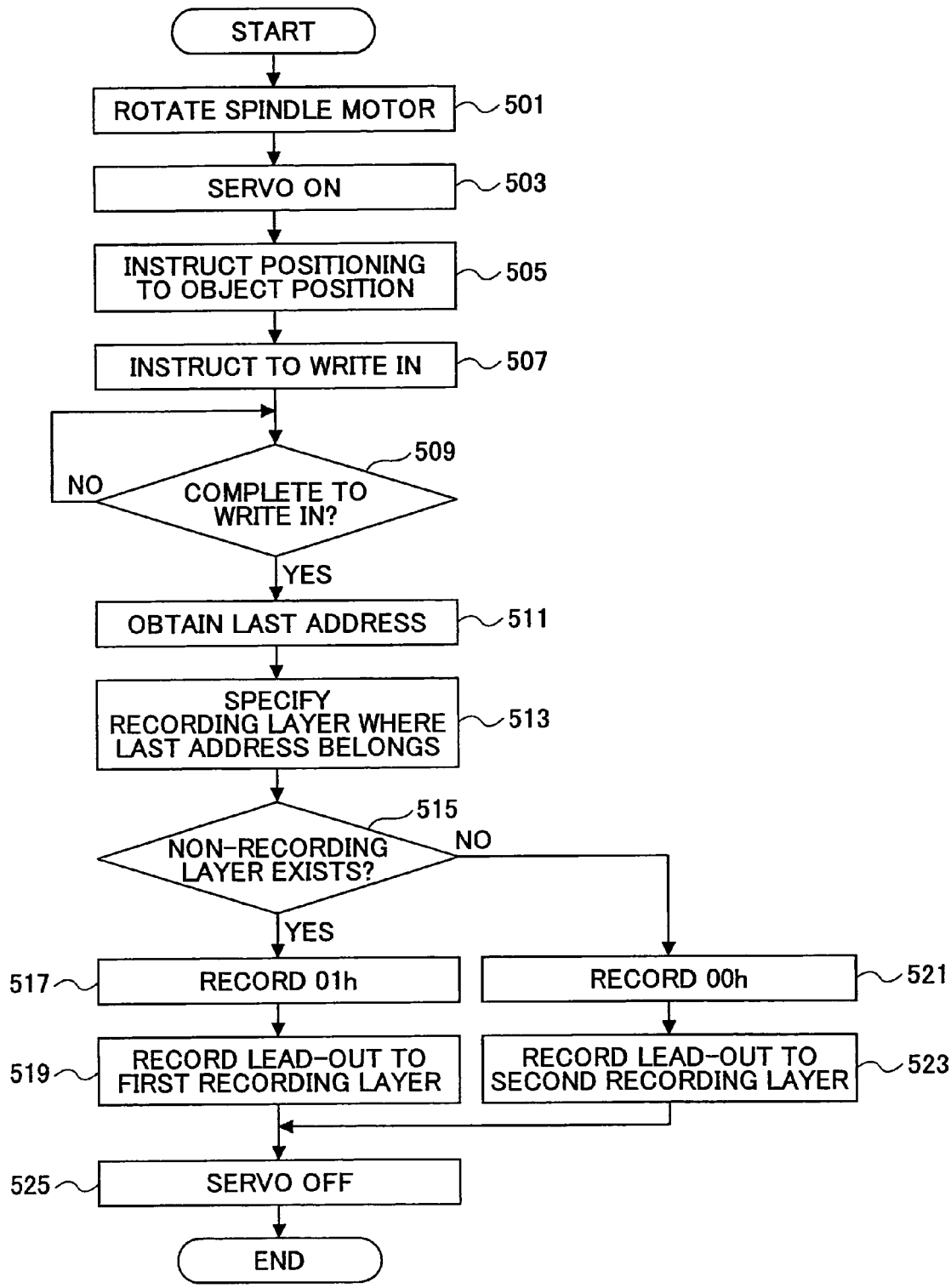
FIG. 5 is a flowchart for explaining a recording process using the optical disk device shown in FIG. 2.

Next, a recording process in the optical disk device 20 when a recording command is received from the host device 90 is discussed with reference to FIG. 5. A flowchart shown in FIG. 5 corresponds to an algorithm of a process performed by the CPU 40. After the recording command is received from the host device 90, a top address of the program corresponding to the flowchart shown in FIG. 5 is set to a program counter of the CPU 40 so that a recording process is started. In this case, the optical disk 15 is a blank disk and recording is performed in the way of the entire disk at-once.

In step 501, the driving control circuit 26 is instructed so that the optical disk 15 is rotated at a designated linear speed or angular speed. The record command that is received from the host computer 90 is provided to the reproduction signal process circuit 28. In addition, storage of the user data (data for recording) received from the host computer 90 for the buffer RAM 34 is provided to the buffer manager 37.

In step 503, after it is confirmed that the optical disk 15 is rotating at the designate linear speed or angular speed, servo-on is set in the driving control circuit 26. Thus, the tracking control and the focus control are implemented. The tracking control and the focus control are performed any time until the recording process is completed.

In step 505, the driving control circuit 26 is instructed so that the optical spot is formed in the vicinity of an object position corresponding to the address designated by the recording command. Thus, the seek operation is performed. If the seek operation is not necessary, this process is skipped.

In step 507, the encoder 25 is instructed to start writing corresponding to the write command.

In step 509, whether the recording of the user data is completed is determined. If the recording of the user data is not completed, the decision of this step is re-determined after designated time passes. If the recording of the user data is completed, the process goes to the next step, namely step 511.

In step 511, a last address LA of the user data recorded in the optical disk 15 is obtained.

In step 513, a recording layer to which the last address LA belongs is specified based on the last address LA obtained in the step 511. For example, as shown in FIG. 6-(A) and FIG. 6-(B), in a case where the last address LA belongs to the recording layer L0, the recording layer L0 is specified.

Referring back to FIG. 5, whether a non-recording layer where the data are not recorded exists among the recording layers of the optical disk 15 is determined, based on a specifying result of step 511, in step 515. For example, in a case where the recording layer L0 is specified as a recording layer to which the last address LA belongs in step 513, the recording layer L1 is the non-recording layer and therefore the process goes to step 517.

In step 517, recording layer information indicating that the recording layer L1 is the non-recording layer, is recorded in the lead-in zone. This recording layer information is recorded at the 18th byte of the Physical Format Information of Control Data Zone included in the lead-in zone. See FIG. 7 through FIG. 9. In this embodiment, in this recording layer information, (01h) indicates that the information is recorded at only the recording layer L0, (02h) indicates that the information is recorded at only the recording layer L1, and (00h) indicates that the information is recorded at both the recording layers L0 and L1. Therefore, in this case, since the information is recorded at only the recording layer L0, (01h) is recorded as the recording layer information.

Figure 6:
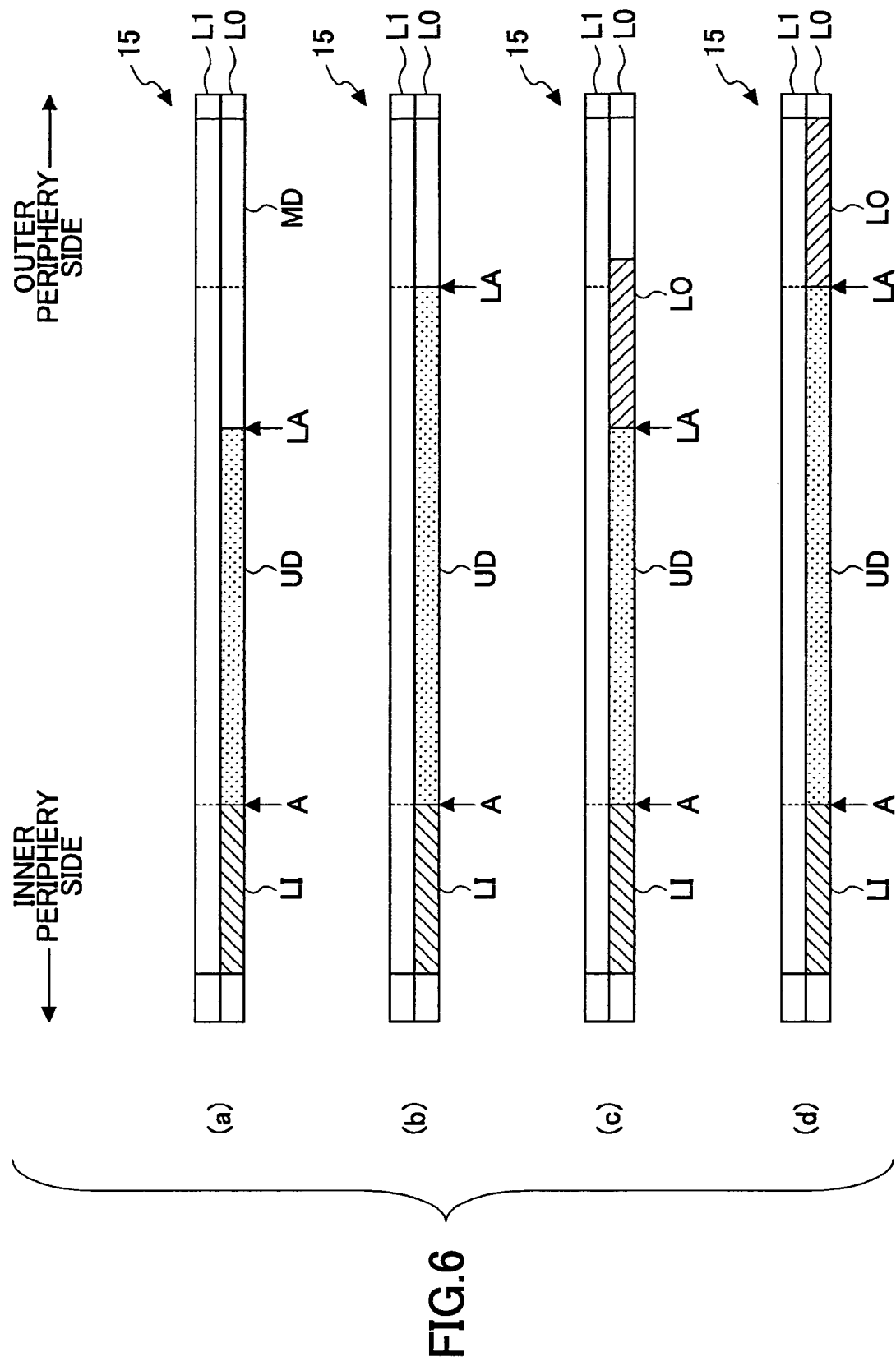
FIG. 6 is a cross-sectional view of an optical disk for explaining a recording process shown in FIG. 4.
Figure 7:
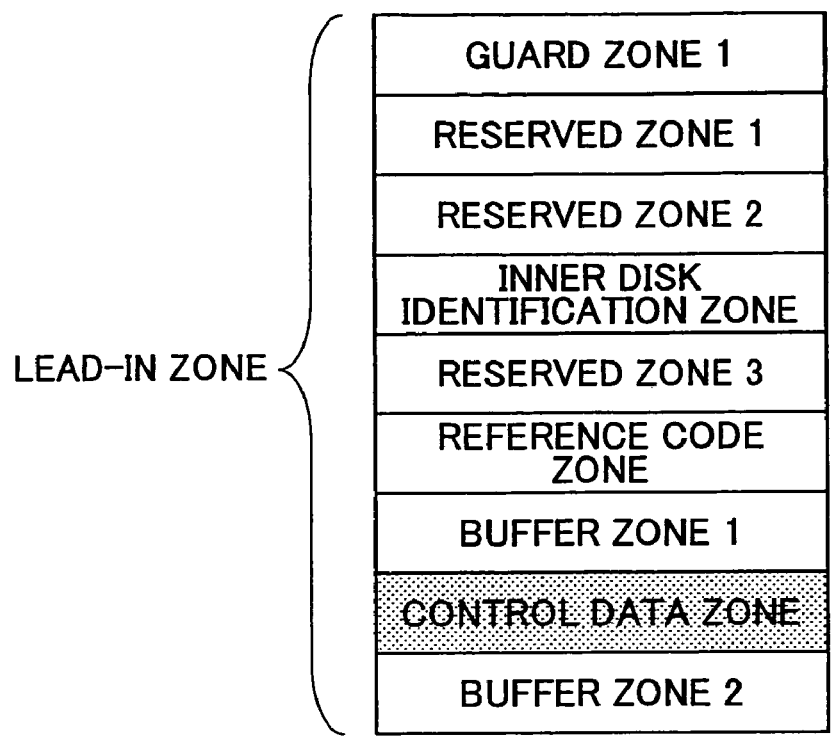
FIG. 7 is a schematic view for explaining a lead-in zone.
Figure 8:
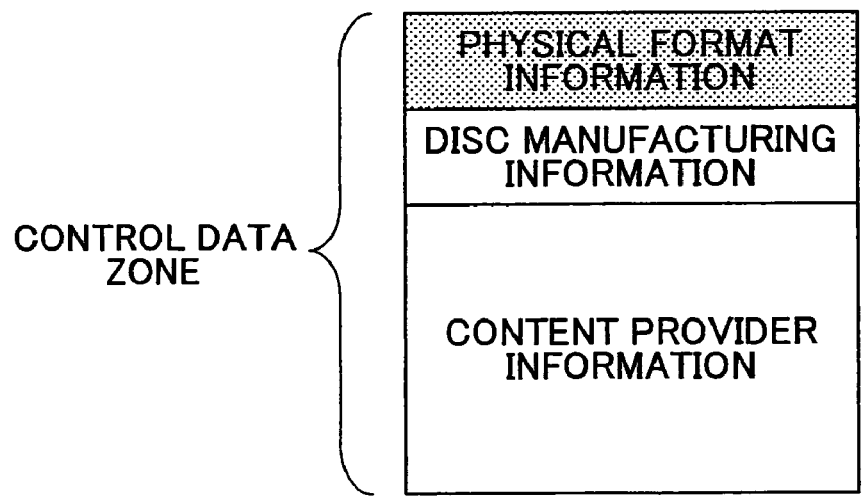
FIG. 8 is a schematic view for explaining a control data zone included in the lead-in zone shown in FIG. 6.

In step 519, as shown in FIG. 6-(C) and FIG. 6-(D), the lead-out is recorded from a next address of the last address LA obtained in step 511 so that a close process is performed.

In step 525, a servo-off is instructed to the driving control circuit 26 so that the recording process is finished.

If the recording layer specified in step 513 is the recording layer L1, the decision in step 515 is "NO" and therefore the process goes to step 521.

In step 521, recording layer information 00h indicating that the recording layers L1 and L2 are recording layers is recorded in the lead-in zone.

Figure 10:
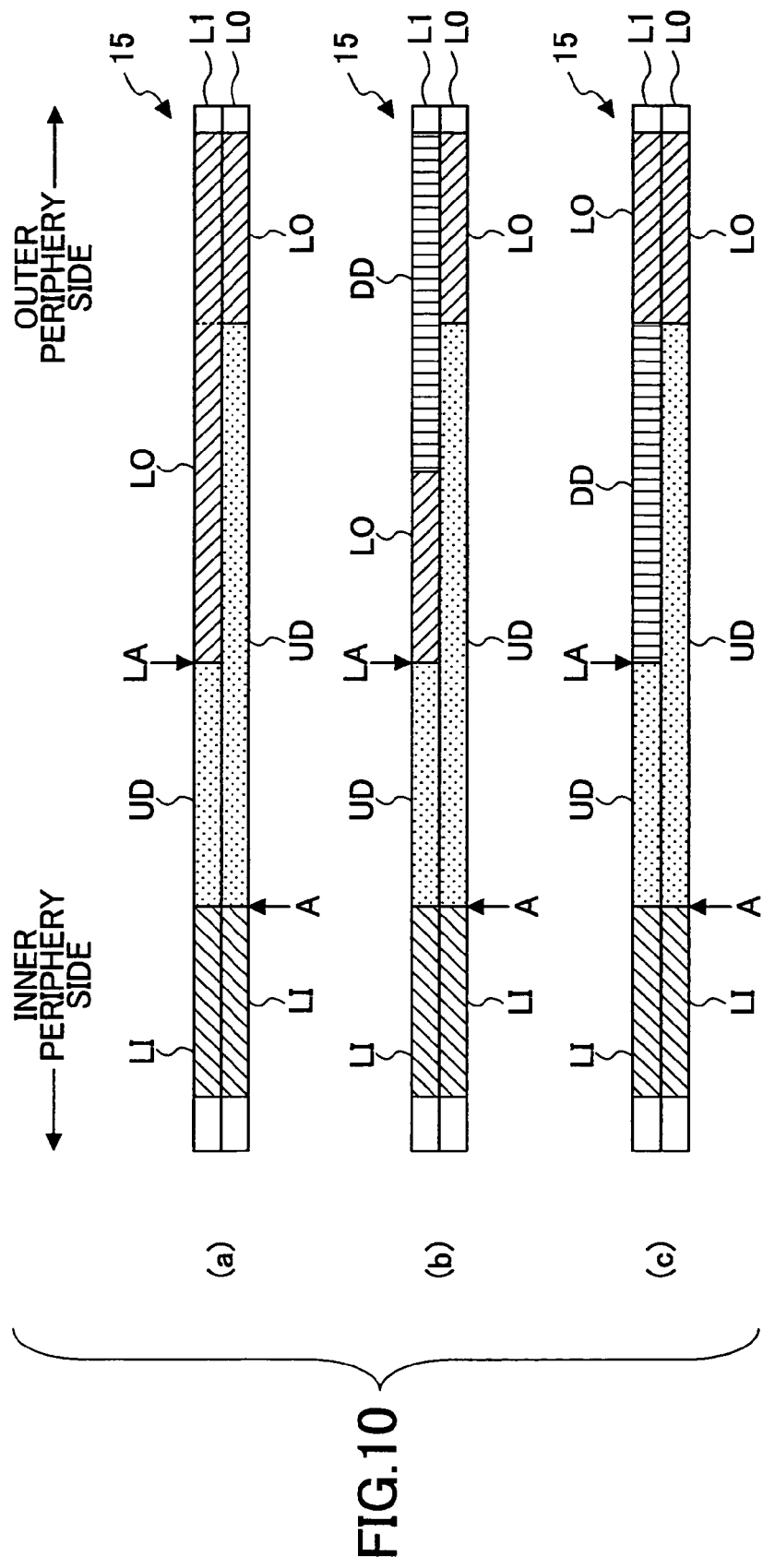
FIG. 10 is a cross-sectional view of an optical disk in a case where the PTP method is used as a recording method.

In step 523, if the user data are recorded by the PTP method, the LO is recorded at the outer periphery side of the LA belonging to the recording layer L1, as shown in FIG. 10-(A). As shown in FIG. 10-(B), dummy data DD may be recorded in a remaining non-recording area after the lead-out is recorded. As shown in FIG. 10-(C), the dummy data DD may be recorded in an area from the last address LA to the lead-out zone so that the lead-out LO can be recorded in the lead-out zone.

Figure 11:
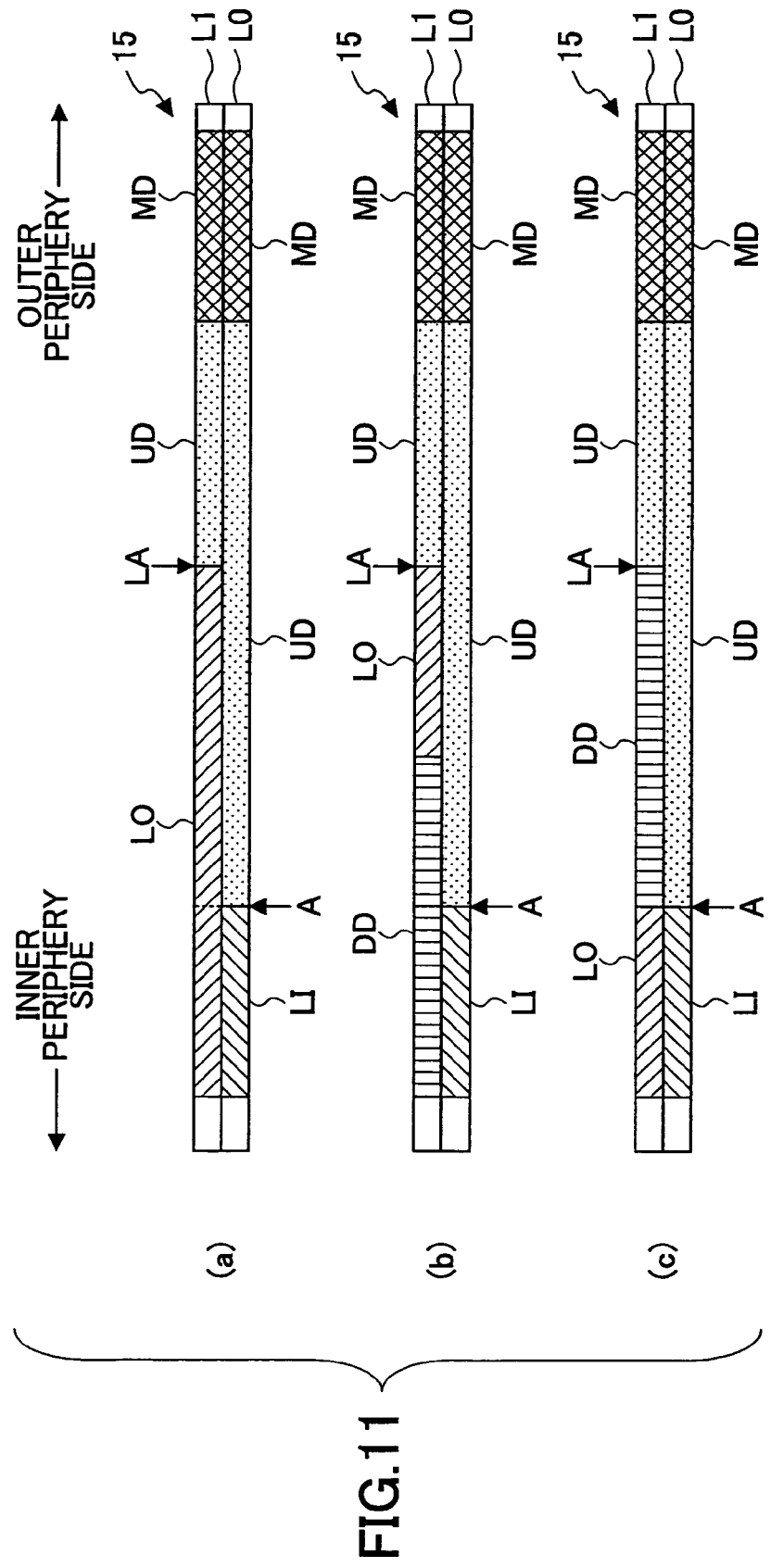
FIG. 11 is a cross-sectional view of an optical disk in a case where the OTP method is used as a recording method.

In a case where the user data are recorded by the OTP method, the LO is recorded at the outer periphery side of the LA belonging to the second recording layer L1, as shown in FIG. 11-(A). Then, the process goes to step 525.

As shown in FIG. 11-(B), the dummy data DD may be recorded in a remaining non-recording area after the lead-out is recorded. As shown in FIG. 11-(C), the dummy data DD may be recorded in a area from the last address LA to the lead-out zone so that the lead-out LO can be recorded in the lead-out zone.

[Reproducing Process]

Figure 12:
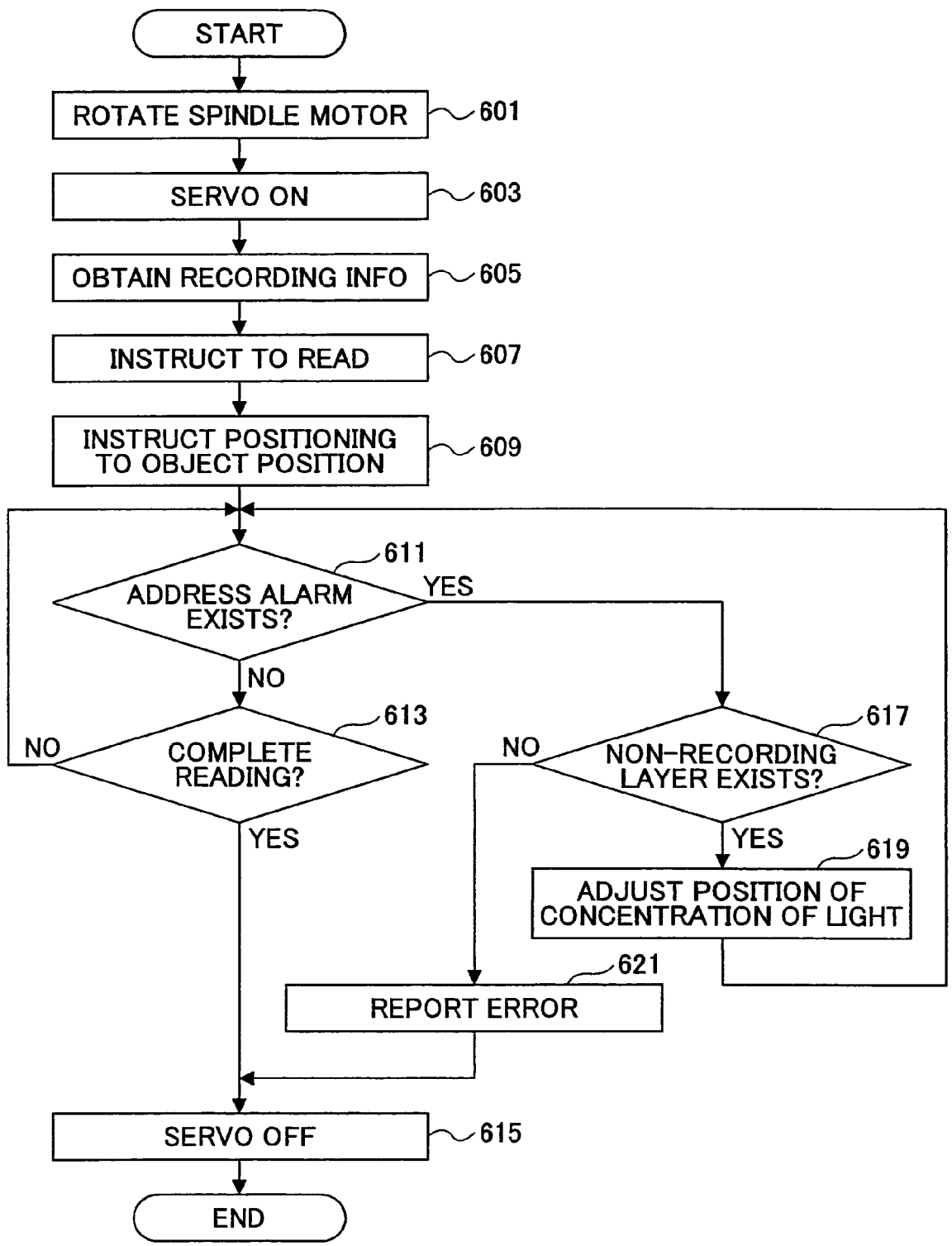
FIG. 12 is a flowchart for explaining a reproducing process of the first embodiment of the present invention.

Next, a reproducing process in the optical disk device 20 when a reproducing command is received from the host device 90 is discussed with reference to FIG. 12. The flowchart shown in FIG. 12 corresponds to an algorithm of a process performed by the CPU 40. After the reproducing command is received from the host device 90, a top address of a program (hereinafter "first reproducing process program") corresponding to the flowchart shown in FIG. 12 is set to a program counter of the CPU 40 so that a reproducing process is started.

In step 601, a control signal for controlling the rotation of he spindle motor 22 based on the reproduction speed is output to the driving control circuit 26. The reproducing command that is received from the host computer 90 is provided to the reproduction signal process circuit 28.

In step 603, after it is confirmed that the optical disk 15 is rotating at the designated linear speed or angular speed, servo-on is set to the driving control circuit 26. Thus, the tracking control and the focus control are implemented. The tracking control and the focus control are performed any time until the recording process is completed.

In step 605, the recording layer information recorded in the lead-in zone of the recording layer L0 is obtained and stored in the RAM 41.

In step 607, an instruction for reading is given to the reproduction signal process circuit 28.

In step 609, the driving control circuit 26 is instructed so that the optical spot is formed in the vicinity of an object position corresponding to the address designated by the reproducing command. Thus, the seek operation is performed. If the seek operation is not necessary, this process is skipped.

In step 611, whether an address alarm signal being output from the reproduction signal process circuit 28 exists is determined. In a case where the address information is not included in the reproduction signal from the optical pick up device 2, the address alarm signal is output from the reproduction signal process circuit 28. Hence, the decision in step 611 is "YES" and the process goes to step 617.

In step 617, whether the non-recording layer exists in the optical disk is determined based on a value of the recording layer information obtained in the step 605. In a case where the value of the recording layer information is (01h), the decision in step 617 is "YES" and the process goes to step 619.

In step 619, based on the value of the recording layer information obtained in step 705 and stored in the RAM 41, the position of the concentration of the laser beam is adjusted so that the laser beam is concentrated on the recording layer L0 via the optical pick up and the process returns to step 611. A process of "step 611, step 617, step 619, and step 611" is repeated until the decision in step 611 is "NO".

In a case where the value of the recording layer information is (00h), the decision in step 617 is "NO" and the process goes to step 621.

In step 621, a reproduction error is reported to the host computer 90.

In step 615, servo-off is instructed to the driving control circuit 26 in step 615 and the process is completed.

On the other hand, in a case where the address information is included in the reproduction signal from the optical pick up device 23, the address alarm signal is not output from the reproduction signal process circuit 28. Hence, the decision in step 611 is "NO" and the process goes to step 613.

In step 613, whether the reading is completed is determined. If the reading is not completed, the decision in step 613 is "NO" so that the process returns to step 611. A process of "step 613, step 611, and step 613" is repeated until the decision in this step is "YES". If the reading is completed, the decision in step 613 is "YES" so that the process goes to step 615 and servo-off is instructed to the driving control circuit 26, so that the reproduction process is completed.

Thus, in the optical device of the first embodiment of the present invention, a recording part (means for recording) is formed by the optical pick up device 23, the laser control circuit 24 and the encoder 25. A process device and an obtaining part (means for obtaining) are realized by the CPU 40 and the program implemented by the CPU 40.

In the first embodiment, a process of deciding whether the non-recording layer of the recording method of the present invention exists is implemented in step 515. In step 517, a process of recording the information for specifying the non-recording layer is implemented in step 517.

Furthermore, in the first embodiment, a process of adjusting the position of the concentration of the laser beam in the reproduction method of the present invention is implemented in steps 611 through 619.

A part or all of the process device or the obtaining part implemented by a process following the program by the CPU 40 may be formed by hardware.

As described above, according to the optical device 20 (information recording device or information reproduction device) of the first embodiment, after the recording of the user data into the optical disk 15 (information recording medium) having two recording layers (L0, L1) is completed, whether the user data are recorded in the recording layer L1 is determined. In a case where the user data are not recorded, the recording layer information indicating that the user data are not recorded in the recording layer L1 is recorded in the lead-in zone of the recording layer L0. Therefore, since it is not necessary to record some data in the recording layer L1, it is possible to record information into the information recording medium in a short period of time.

Furthermore, according to the optical device 20 of this embodiment, when the user data are reproduced, the recording layer information recorded in the lead-in zone of the recording layer L0 of the optical disk 15 is obtained in advance, and whether the information is recorded in the recording layer L1 is determined based on the recording layer information. As a result of this, if the recording layer L1 is the non-recording layer, the information is reproduced while the optical pick up device is driven so that the laser beam is always concentrated on the recording layer L0. Hence, even if the non-recording layer exists, it is possible to stably reproduce the information recorded in the information recording medium.

In the first embodiment, whether the non-recording layer exists in the information recording medium is determined based on the last address LA when the writing of the user data is completed. However, the present invention is not limited to this. In a case where the amount of the user data to be recorded is recognized in advance, whether the non-recording layer exists in the information recording medium may be determined based on the amount of the user data. In this case, whether the non-recording layer exists may be determined before the user data are recorded.

In addition, in the first embodiment, the recording layer information is recorded at the 18th byte of the physical format information. However, the present invention is not limited to this. The recording layer information may be recorded in another non-used byte position.

Furthermore, in the first embodiment, the recording layer information is recorded in the lead-in zone. However, the present invention is not limited to this. An area where the recording layer information is recorded in the lead-out zone or the data zone may be provided.

In addition, in the first embodiment, recording is performed in the way of the entire disk at-once. However, the present invention is not limited to this. The recording layer information may be recorded when a disk close order is received from the host device 90.

Second Embodiment

Figure 13:
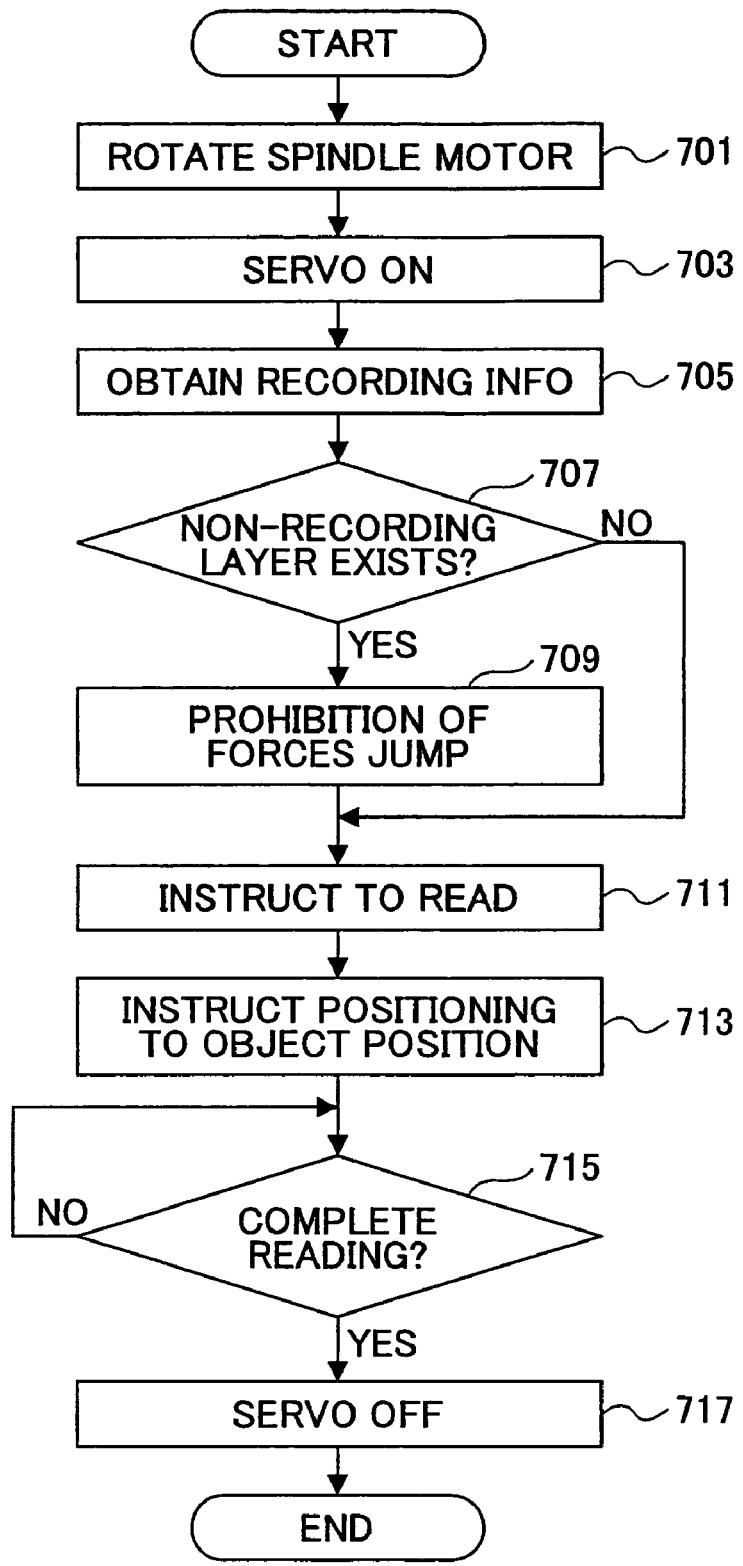
FIG. 13 is a flowchart for explaining a reproducing process of the second embodiment of the present invention.

Next, the second embodiment of the present invention is discussed with reference to FIG. 13. In the second embodiment, a program (hereinafter "second reproducing process program") different from the first reproducing process program is used. The structure of an optical disk device of the second embodiment is the same as the first embodiment. Hence, in the second embodiment, parts that are the same as the parts in the first embodiment are given the same reference numerals, and explanation thereof is omitted.

A reproducing process in the optical disk device 20 of the second embodiment is now discussed. The flowchart shown in FIG. 13 corresponds to an algorithm of a process performed by the CPU 40. After the reproducing command is received from the host device 90, a top address of the program (second reproducing process program) corresponding to the flowchart shown in FIG. 13 is set to a program counter of the CPU 40 so that a reproducing process is started.

In step 701, a control signal for controlling the rotation of the spindle motor 22 based on the reproduction speed is output to the driving control circuit 26. The reproducing command that is received from the host computer 90 is provided to the reproduction signal process circuit 28.

In step 703, after it is confirmed that the optical disk 15 is rotating at the designate linear speed or angular speed, servo-on is set to the driving control circuit 26. Thus, the tracking control and the focus control are implemented. The tracking control and the focus control are performed any time until the recording process is completed.

In step 705, the value of the recording layer information recorded in the lead-in zone is obtained and stored in the RAM 41.

In step 707, whether the non-recording layer exists in the recording layers of the optical disk is determined based on the value of the recording layer information obtained in step 705. In a case where the recording layer has a value of (01h), the decision in step 707 is "YES" and the process goes to the step 709. On the other hand, in a case where the recording layer has a value of (00h), the decision in step 709 is "NO" and the process skips step 709 and goes to step 711.

In step 709, focus jump of the laser beam to the recording layer L1 that is the non-recording layer is prevented. That is, the concentration of the laser beam to the recording layer L1 is prohibited.

In step 711, writing is instructed to the reproduction signal process circuit 28.

In step 713, the driving control circuit 26 is instructed so that the laser beam is concentrated in the vicinity of an object position corresponding to the address designated by the reproducing command. Thus, the seek operation is performed. If the seek operation is not necessary, this process is skipped.

In step 715, whether the reading is completed is determined. If the reading is not completed, the decision in this step is "NO" and re-determined after the designated time passes. If the reading is completed, the decision is "YES" and the process goes to the next step, namely step 717.

In step 717, servo-off is instructed to the driving control circuit 26 and the process is completed.

As described above, in the optical device of the second embodiment of the present invention, a process device and an obtaining part (means for obtaining) are realized by the CPU 40 and the program implemented by the CPU 40.

Furthermore, in the second embodiment, a process for setting the prohibition of concentration of the laser beam by the reproducing method of the present invention is implemented by a process in step 709.

A part or all of the process device or the obtaining part implemented by a process following the program by the CPU 40 may be formed by hardware.

According to the optical disk device 20 of the second embodiment of the present invention, when the reproducing is performed, information for specifying the non-recording layer recorded in the lead-in zone of the recording layer L0 of the optical disk 15 is obtained in advance, so that whether the user data are recorded in the recording layer L1 is determined based on this information. If the recording layer L1 is non-recording layer, the laser beam is prevented from being concentrated on the recording layer L1. Therefore, even if the recording layer L1 is a non-recording layer, it is possible to stably reproduce the information. That is, it is possible to stably reproduce the information recorded in the information recording medium having plural recording layers.

In the above-discussed embodiments, the optical disk 15 has two recording layers. However, the present invention is not limited to this. The optical disk 15 may have three or more recording layers.

Furthermore, in the above-discussed embodiments, the recording layer information (01h) indicates that the information is recorded at only the recording layer L0, the recording layer information (02h) indicates that the information is recorded at only the recording layer L1, and the recording layer information (00h) indicates that the information is recorded at both the recording layers L0 and L1. However, the present invention is not limited to this. For example, the recording layer information (01h) may indicate that the information is not recorded at the recording layer L0, the recording layer information (02h) may indicate that the information is not recorded at the recording layer L1, and the recording layer information (00h) may indicate that the information is recorded at both the recording layers L0 and L1.

In the above-discussed embodiments, the bi-layer DVD+R is used as the information recording medium. However, the present invention is not limited to this. The present invention may be used for DVD-RW (DVD-rewritable), DVD+RW (DVD+rewritable), or DVD-R (DVD-recordable) having plural recording layers, or an information recording medium corresponding to the laser beam having a wave length of approximately 405 nm.

In the reproducing process of the above-discussed embodiments, the bi-layer DVD+R is used as the information recording medium. However, the present invention is not limited to this. For example, the present invention can be applied to an information recording medium having plural recording layers exclusively for reproducing where the recording layer information is recorded, such as a single surface bi-layer DVD-ROM.

In the above-discussed embodiments, the optical pick up device 23 has a single semiconductor laser. However, the present invention is not limited to this. The optical pick up device 23 may have plural the semiconductor lasers which emit light fluxes having different wave lengths from each other. In this case, corresponding semiconductor lasers, for example, may emit light fluxes having a wave length of approximately 405 nm, a light flux having a wave length of approximately 660 nm, and a light flux having a wave length of approximately 780 nm. That is, an optical disk device which corresponds to plural kinds of optical disks in accordance with different standards may be used. In this case, at least one of the optical disks may be a multilayer disk.

The present invention is not limited to the above-discussed embodiments, but variations and modifications may be made without departing from the scope of the present invention.

This patent application is based on Japanese Priority Patent Application No. 2004-163016 filed on Jun. 1, 2004, the entire contents of which are hereby incorporated by reference.

What is claimed is:

1. A reproducing method for reproducing information from an information recording medium by irradiating a laser beam, the information recording medium including:
    a plurality of recording layers including a non-recording layer on which there is no user data recorded,
    wherein information for specifying the non-recording layer is recorded in the information recording medium;
the reproducing method comprising:
    a step of adjusting a position of concentration of the laser beam based on the information for specifying the non-recording layer, if a reading error of an address exists.

2. An information reproducing device for reproducing information from an information recording medium,
    the information recording medium, including:
        a plurality of recording layers including a non-recording layer on which there is no user data recorded,
        wherein information for specifying the non-recording layer is recorded in the information recording medium;
    the information reproducing device, comprising:
        an optical pick up device configured to concentrate a laser beam onto a recording layer that is a reproducing subject among the plural recording layers of the information recording medium;
        an obtaining part configured to obtain the information for specifying the non-recording layer from the information recording medium; and
        a process device configured to control the optical pick up device based on the information for specifying the non-recording layer so as to reproduce information from the recording layer that is the reproducing subject, wherein the process device adjusts a position of concentration of the laser beam based on the information for specifying the non-recording layer if a reading error of an address exists.

* * * * *